Jan. 17, 1956 D. J. DICKERSON 2,730,906
WHEEL STRUCTURE
Filed July 28, 1952
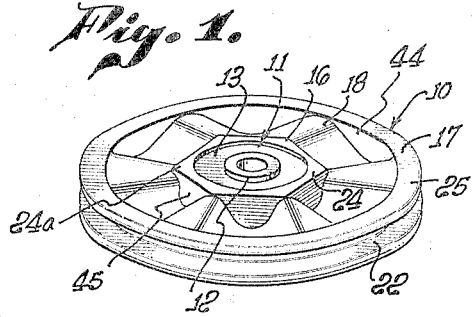
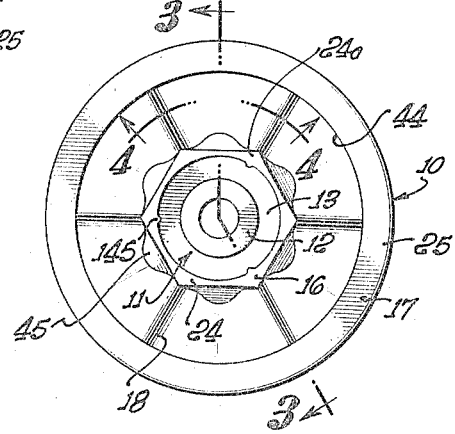
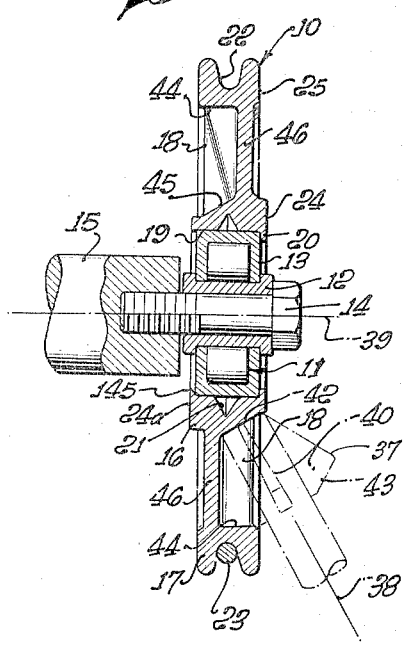
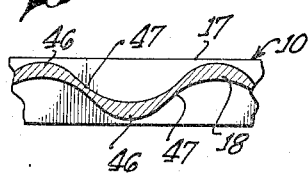
DELBERT J. DICKERSON,
INVENTOR.
BY *[signature]*
ATTORNEY.

United States Patent Office 2,730,906
Patented Jan. 17, 1956

2,730,906

WHEEL STRUCTURE

Delbert J. Dickerson, Agoura, Calif., assignor to Ardell Mfg. Co., Agoura, Calif., a corporation of California Application July 28, 1952, Serial No. 301,236

7 Claims. (Cl. 74—230.05)

This invention relates to an improved type of wheel structure, the invention being typically applicable to pulley wheels, gear wheels and the like, and especially to wheels for use in the control and other mechanism of an aircraft.

The general object of the present invention is to provide an improved wheel which is particularly designed to have maximum structural strength with a minimum of weight, so as to be usable in aircraft where both strength and lightness are extremely important. As will appear, these results are achieved in part by specially shaping the wheel to assume contours which resist deformation of the material. Also, the wheel is preferably of such a shape as to be readily made by milling from a piece of forged or other high strength stock, to avoid the possibilities of weakness which may result from casting.

Structurally, the wheels of the present invention are provided with radially extending portions having curvatures such as to present arched or essentially arcuate portions adapted to effectively resist deformation under strain, though they may be formed of relatively thin material. Preferably, these portions form together a wave-like structure which, as it advances in a circular direction about the wheel axis, extends first toward one axial direction, then back toward the opposite axial direction, and then again toward the first axial direction. For maximum strength, this wave-like configuration may continue entirely about the wheel axis to form a unitary high strength body having several deformation resisting arched portions. Also, since the maximum strength of this body is in its arched portions, those portions are desirably of somewhat greater thickness than the intermediate relatively straight portions of the wave-like structure.

For positively integrating the wheel structure, it preferably includes a rigid portion of increased thickness either radially inwardly or radially outwardly of the arched portions of the wheel. Best strength and use characteristics are attained by having such increased thickness portions, desirably of essentially annular configuration, both at the inside and outside of the arched or wave-like portion of the wheel. The outermost of these may contain a belt receiving groove, where the wheel is to be used as a pulley, and the inner increased thickness portion may serve as a mounting hub. In this connection, certain particular features of the invention have to do with the special formation of the inner hub portion of the wheel to both add to the wheel strength and facilitate its attachment to a mounting bearing. For this purpose, the hub is preferably designed to have an increased radial dimension at certain locations, which supplement the strength at the arched portions of the wheel and provide locations at which the hub may be readily swaged to retain a bearing within the hub. For best structural characteristics, these increased radial dimension portions of the hub are such as to give the hub an externally essentially polygonal shape, typically that of a regular hexagon.

The above and other features and objects of the present invention will be better understood from the following detailed description of the typical embodiment illustrated in the accompanying drawing, in which:

Fig. 1 is a perspective view of a pulley wheel embodying the invention;

Fig. 2 is a side view of the Fig. 1 wheel;

Fig. 3 is an enlarged diametrical section through the wheel taken on line 3—3 of Fig. 2;

Fig. 4 is an enlarged fragmentary section through the wheel taken on line 4—4 of Fig. 2; and Fig. 5 is a side view partly in section of a device for forming the wave-like portion of the wheel of Figs. 1 to 4.

Referring first to Figs. 1 to 3, the illustrated pulley wheel includes a main one-piece essentially annular body 10 typically formed of aluminum or other light metal, and a central bearing 11. The bearing may be of any conventional construction, and as shown includes an inner tubular journal portion 12 and an annular portion 13 received about, and rotatable with body 10 relative to, the journal 11. As seen best in Fig. 3, the wheel may be mounted by a screw or other element 14 extending through journal portion 11 of the bearing and screwing into a suitable support 15.

The wheel body 10 may be considered as comprising a radially inner essentially annular hub or mounting portion 16, a radially outer portion 17 spaced from hub 16, and concentric with portion 16, and a reduced thickness web portion 18 of wave-like configuration extending radially between portions 16 and 17. The inner portion 16 of the wheel contains an inner cylindrical bore 19 within which the externally cylindrical bearing unit 11 is received. At one axial side of the wheel, the body 10 has a radially inwardly extending flange or shoulder 20, against which the bearing unit bears to assure its accurate positioning within the wheel body. At a central portion of inner bore 19, wheel body 10 may be annularly recessed at 21.

The radially outer portion 17 of the wheel body contains a peripheral radially outwardly facing groove 22, within which a bolt 23 is received. The outer portion of the wheel preferably has a slightly smaller axial dimension than hub portion 16, as best seen in Fig. 3. Both of these essentially annular inner and outer portions of the wheel body are desirably defined at their opposite sides by planer faces extending directly transversely of the wheel axis, and designated 24 and 25 respectively, in the drawing.

The wave-like web portion 18 of the wheel can be best described by reference to the manner of its formation by the apparatus 26 shown in Fig. 5. This apparatus includes an upstanding externally cylindrical carrier member 27, to the horizontal upper side of which wheel blank 28 is fastened in horizontally extending condition, as by means of a washer 29 and screw 30 fastened into the carrier. Screw 30 is tightened sufficiently to fasten blank 28 in fixed relation to the carrier. When fastened to carrier 27, the blank has an inner flat sided portion 16a from which hub portion 16 is to be formed, and along its entire radial extent from portion 16a to the periphery of the wheel is of a slightly reduced axial thickness corresponding to the outer portion 17 of the finished wheel.

Carrier 27 is mounted for rotation about the vertically extending axis of the carrier pulley wheel, and for vertical movement along that axis, by sliding reception of an upstanding pin 31 of a support member 32 within bore 33 at the underside of the carrier. When a wheel is being worked on, carrier 27 and the wheel blank are continuously rotated at a constant rate of speed by a worm drive 34, which is mounted for vertical movement with the carrier member and may be driven by any suitable power source. During such rotation, carrier 27 is moved alternately upwardly and downwardly by engagement of a pair of carrier wheels 35 with a supporting upwardly facing cam surface 36 on support member 32. Cam surface 36 has a vertically waving configuration corresponding essentially to the wave form which is to be milled into wheel blank 28.

As blank 28 is rotated and moved alternately upwardly and downwardly by carrier 27, the wave-like surface of web portion 18 of the wheel is formed by rapidly rotating milling cutter 37, which is driven by a suitable power source, and is positioned with its axis 38 at an angle to both the wheel axis 39 and a plane extending perpendicularly to the plane axis. The cutter axis 38, if continued inwardly, would intersect axis 39 of the wheel and carrier. The cutter itself is of an essentially frusto-conical configuration, having a number of circularly spaced cutter blades 40, presenting main relatively converging cutting edges 41 which in their lowermost position extend directly transversely of the wheel axis 39. At their inner ends, cutting blades 41 having cutting edges 42 extending directly transversely of the cutter axis, and at their outer ends, blades 40 have somewhat longer cutting edges which in the lowermost position of the blades extend directly vertically.

It will be apparent that as carrier 27 rotates and moves alternately up and down, while cutter 37 is turning about its axis, cutter edges 41 form one of the waving side surfaces of web portion 18 of the wheel, while outer cutting edges 43 form an essentially cylindrical inner side 44 of peripheral portion 17 of the wheel. The innermost transverse cutting edges 42 of the cutter form a number of planar surfaces 45, which may be considered as the outer surfaces of inner hub portion 16 of the wheel. Planar surfaces 45 extend at an angle to wheel axis 39, and together give the hub portion of the wheel, at each side of web 18, the external shape of a regular polygon, typically a hexagon. By virtue of this polygonal shape of inner hub portion 16, the side faces 24 of the hub have portions 24a of increased radial dimension at the intersection of planar faces 45, which increased dimension provides substantial areas at which the wheel body material may be slightly deformed or swaged inwardly (at an axial side of the wheel opposite that at which flange 20 is formed) to tightly retain bearing 11 within the wheel body. Such swaging of the material is indicated at 145 in Fig. 3.

After one side of the wheel blank has been milled by the apparatus of Fig. 5, the blank is turned over and its opposite side similarly milled. The resulting configuration of the web portion 18 of the wheel is shown best in Fig. 4, in which it is brought out that the waving portion of the wheel, as it advances circularly, extends alternately toward opposite axial directions. The web thus is provided with a number of radially extending arched portions 46, which alternately face in opposite axial directions, and by virtue of their curvature lend great strength and rigidity to the wheel. The relatively straight portions 47 between arched portions 46 of the web may be of a reduced thickness, since the major strength of the wheel is supplied by the curved portions of the web. Such change in thickness of the web portion of the wheel is of course arrived at by proper design of cam surface 36 in the Fig. 5 apparatus. The strength of the web portion of the wheel is further enhanced by the fact that the increased radial dimension portions of hub 16, at each side of the web, are located at the points at which the web extends closest to the corresponding axial side of the wheel.

I claim:

1. A wheel comprising a body adapted to be mounted for rotation about an axis and having a portion of wave-like configuration extending radially of said axis and in a direction circularly thereabout, said wave-like portion of the body being defined by a pair of generally parallel opposite side surfaces which in advancing progressively in one circular direction extend essentially in unison first toward one axial direction then toward the opposite axial direction and then back toward said first axial direction, and said body having radially inwardly of said wave-like portion an essentially annular inner portion of an axial thickness greater than the thickness of said wave-like portion, a part of said inner portion of the body located at one axial side of said wave-like portion forming in cross section essentially a polygon the adjacent sides of which essentially intersect at substantially the points at which said wave-like portion is deflected farthest toward said one axial side.

2. A wheel comprising a body adapted to be mounted for rotation about an axis and having a radially inner hub portion and a circular series of reduced thickness wave-like portions extending radially outwardly from said hub portion and alternately cavitated axially inwardly from opposite axial sides of the body, said inner portion of the body having a radially outer surface of essentially polygonal cross-sectional configuration located to one axial side of said reduced portions of the body.

3. A wheel comprising a body adapted to be mounted for rotation about an axis and having a portion of wave-like configuration extending radially of said axis and continuously entirely thereabout, said wave-like portion of the body being defined by a pair of generally parallel opposite side surfaces which in advancing progressively in one circular direction extend substantially in unison alternately toward opposite axial directions, and said body having radially inwardly of said wave-like portion an inner hub portion of an axial thickness greater than the thickness of said wave-like portion, said inner portion forming in cross-section at each axial side of the wave-like portion essentially a polygon the adjacent sides of which essentially intersect at the points at which said wave-like portion is deflected farthest toward the same axial side.

4. A wheel comprising a body adapted to be mounted for rotation about an axis and having a portion of wave-like configuration extending radially of said axis and in a direction circularly thereabout, said wave-like portion of the body being defined by a pair of generally parallel opposite side surfaces which in advancing progressively in one circular direction extend essentially in unison first toward one axial direction then toward the opposite axial direction and then back toward said first axial direction, said body having radially inwardly of said wave-like portion an essentially annular inner portion of an axial thickness greater than the thickness of said wave-like portion, said inner portion forming in cross-section at one axial side of the wave-like portion essentially a polygon the adjacent sides of which essentially intersect at substantially the points at which said wave-like portion is deflected farthest toward said one axial side, said inner portion of the body containing an inner bore, and a bearing received in said bore, the material of said inner portion of the body being swaged at substantially the intersections of said polygon sides to retain the bearing in said bore.

5. A pulley wheel comprising a body adapted to be mounted for rotation about an axis and having a portion of wave-like configuration extending radially of said axis and continuously entirely thereabout, said wave-like portion of the body being defined by a pair of generally parallel opposite side surfaces which in advancing progressively in one circular direction extend substantially in unison alternately toward opposite axial directions, and said body having radially inwardly and outwardly respectively of said wave-like portion an inner essentially annular hub portion and an outer essentially annular peripheral portion both rigidly attached to the wave-like portion, both of said annular inner and outer portions of the body being of axial thickness greater than said wave-like portion, said inner hub portion of the body being of externally essentially regular polygonal configuration at each axial side of said wave-like portion, said outer portion of the body containing an annular belt receiving groove, and said wave-like portion of the body having curved portions at which said side surfaces thereof change their direction of axial movement and intermediate relatively straight portions thinner than said curved portions, the polygons defined by said hub portion having their adjacent sides essentially intersecting at substantially said curved portions of the wave-like portion of the body.

6. A wheel comprising a body adapted to be mounted for rotation about an axis and having a radially inner hub portion and a circular series of reduced thickness wave-like portions extending radially outwardly from said hub portion and alternately cavitated axially inwardly from opposite axial sides of the body, said inner portion of the body having a radially outer surface of essentially polygonal cross-sectional configuration located to one axial side of said reduced portions of the body, the polygon defined by said inner portion having its adjacent sides essentially intersecting at substantially the points at which said wave-like portions are deflected farthest toward said one axial side.

7. A wheel as recited in claim 6, in which the polygon defined by said inner portion of the body is essentially a regular polygon.

References Cited in the file of this patent

UNITED STATES PATENTS

| | | |
|---|---|---|
| 389,787 | Bagaley et al. | Sept. 18, 1888 |
| 884,720 | Curtis | Apr. 14, 1908 |
| 922,161 | Lanyon | May 18, 1909 |
| 1,231,856 | Crane | July 3, 1917 |
| 1,761,825 | Greve | June 3, 1930 |
| 1,986,698 | Winkler | Jan. 1, 1935 |
| 2,366,247 | Fauser | Jan. 2, 1945 |
| 2,480,807 | DeVlieg | Aug. 30, 1949 |
| 2,530,665 | Searles | Nov. 21, 1950 |